United States Patent [19]

Yoshida

[11] Patent Number: 4,939,680

[45] Date of Patent: Jul. 3, 1990

[54] EXPERT SYSTEM USING DEEP KNOWLEDGE AND SHALLOW KNOWLEDGE

[75] Inventor: Kenichi Yoshida, Hachioji, Japan

[73] Assignee: Hitachi, Ltd., Tokyo, Japan

[21] Appl. No.: 310,761

[22] Filed: Feb. 14, 1989

[30] Foreign Application Priority Data

Feb. 15, 1988 [JP] Japan .................................. 63-30739
May 30, 1988 [JP] Japan ................................ 63-130101

[51] Int. Cl.$^5$ .............................................. G06F 15/18
[52] U.S. Cl. .................................. 364/513; 364/274.3; 364/917.93
[58] Field of Search .......................... 364/513, 200, 900

[56] References Cited

U.S. PATENT DOCUMENTS

| | | | |
|---|---|---|---|
| 4,591,983 | 5/1986 | Bennett et al. | 364/403 |
| 4,658,370 | 4/1987 | Erman et al. | 364/513 |
| 4,847,784 | 7/1989 | Clancey | 364/513 |

OTHER PUBLICATIONS

*Real-Time Expert Systems in Process Control*, Computing and Control Division (Colloquium), 11/29/85.

P. J. Hayes, "The Naive Physics Manifesto", in Michie D. (ed.) Expert Systems in the Micro-Electronic Age, Edinburgh University Press, 1979, pp. 242-270.

Chuck Rieger and Milt Grinberg, "The Declarative Representation and Procedural Simulation of Causality in Physical Mechanisms", Proc. of IJCAI-77, 1977, pp. 250-256.

Toyoaki Nishida, "Qualitative Reasoning-Formal Models of Commonsense Reasoning", Journal of Japanese Society for Artificial Intelligence, vol. 12, No. 1, 1987, pp. 30-43.

Takahira Yamaguchi et al., "Basic Design of Knowledge Compiler Based on Deep Knowledge", Journal of Japanese Society for Artificial Intelligence, vol. 2, No. 3, 1987, pp. 333-340.

Tom M. Mitchell et al., "Explanation-Based Generalization: A Unifying View", Machine Learning 1: 47-80, 1986, pp. 47-80.

*Primary Examiner*—Joseph Ruggiero
*Assistant Examiner*—Paul Gordon
*Attorney, Agent, or Firm*—Fay, Sharpe, Beall, Fagan, Minnich & McKee

[57] ABSTRACT

An expert system infers by using deep knowledge and shallow knowledge. The deep knowledge may be physical rules which are basically satisfied in an electrical circuit which is an object of inference, and the shallow knowledge may be assumption knowledge derived from expert experience relating to the electrical circuit. The deep knowledge includes structure information of the object of inference and equation information representing behavior of the object. The structure of the shallow knowledge, which includes a concluding equation derived by omitting a portion of the equation of the deep knowledge, a conditional equation representing a condition under which the concluding equation is satisfied and the omitted item, is made essentially similar to the structure of the deep knowledge so that both the deep knowledge and the shallow knowledge are uniformly handled in one inference process.

6 Claims, 15 Drawing Sheets

FIG. 3

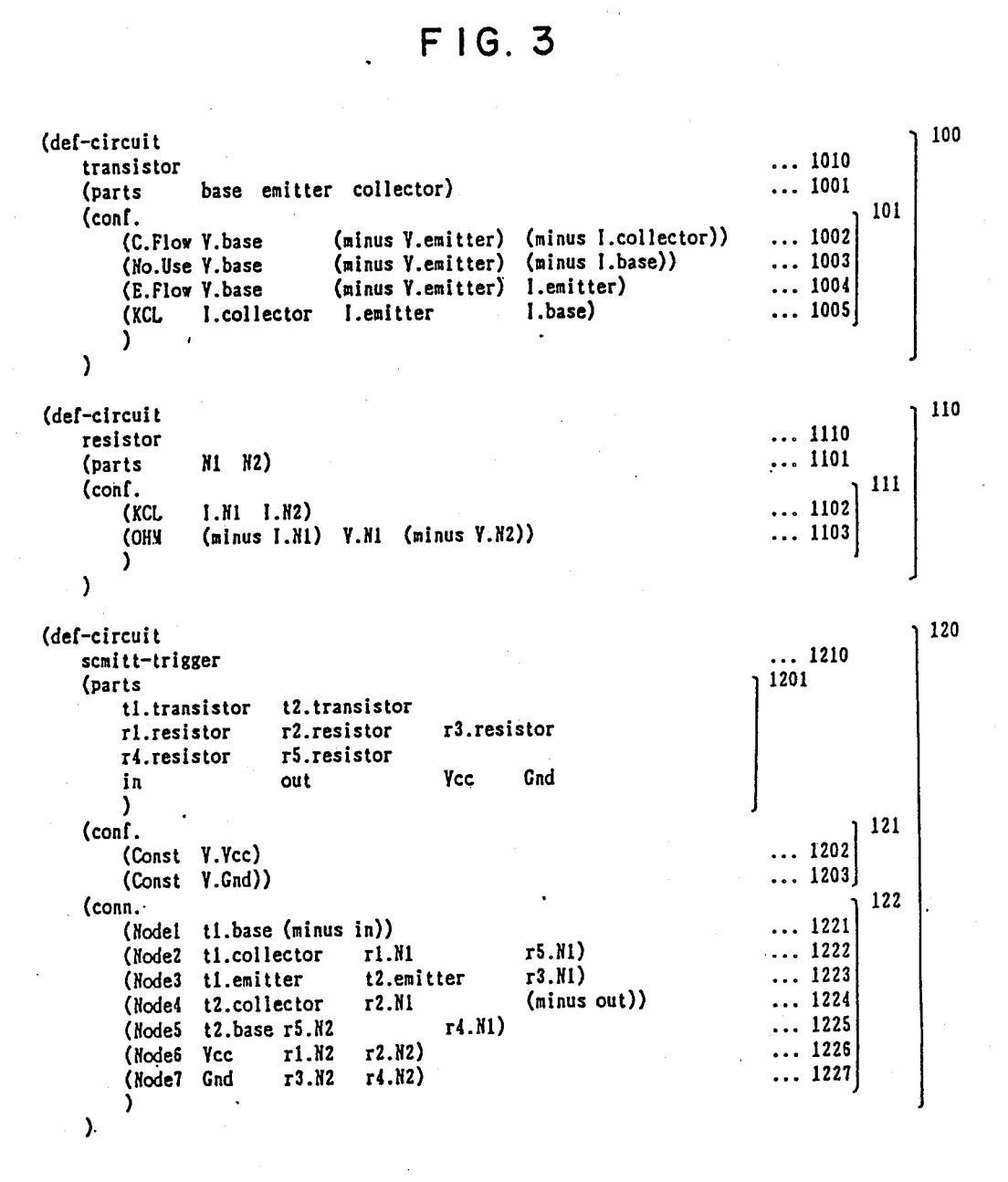

```
(def-circuit
    transistor                                                      ... 1010      ⎤ 100
    (parts    base    emitter    collector)                         ... 1001      ⎥
    (conf.                                                                        ⎤ 101
        (C.Flow  V.base       (minus V.emitter)  (minus I.collector)) ... 1002   ⎥
        (No.Use  V.base       (minus V.emitter)  (minus I.base))    ... 1003     ⎥
        (E.Flow  V.base       (minus V.emitter)  I.emitter)         ... 1004     ⎥
        (KCL     I.collector  I.emitter          I.base)            ... 1005     ⎦
    )
)

(def-circuit
    resistor                                                        ... 1110      ⎤ 110
    (parts    N1   N2)                                              ... 1101      ⎥
    (conf.                                                                        ⎤ 111
        (KCL   I.N1   I.N2)                                         ... 1102     ⎥
        (OHM   (minus I.N1)   V.N1   (minus V.N2))                  ... 1103     ⎦
    )
)

(def-circuit
    scmitt-trigger                                                  ... 1210      ⎤ 120
    (parts                                                          ⎤ 1201        ⎥
        t1.transistor    t2.transistor                              ⎥             ⎥
        r1.resistor      r2.resistor       r3.resistor              ⎥             ⎥
        r4.resistor      r5.resistor                                ⎥             ⎥
        in               out               Vcc        Gnd           ⎦             ⎥
    )                                                                             ⎥
    (conf.                                                                        ⎤ 121
        (Const  V.Vcc)                                              ... 1202     ⎥
        (Const  V.Gnd))                                             ... 1203     ⎦
    (conn.                                                                        ⎤ 122
        (Node1   t1.base (minus in))                                ... 1221     ⎥
        (Node2   t1.collector    r1.N1        r5.N1)                ... 1222     ⎥
        (Node3   t1.emitter      t2.emitter   r3.N1)                ... 1223     ⎥
        (Node4   t2.collector    r2.N1        (minus out))          ... 1224     ⎥
        (Node5   t2.base r5.N2                r4.N1)                ... 1225     ⎥
        (Node6   Vcc     r1.N2   r2.N2)                             ... 1226     ⎥
        (Node7   Gnd     r3.N2   r4.N2)                             ... 1227     ⎦
    )
).
```

FIG. 4

```
(def-assumption                                                              ⎫ 200
    h1t
        ... 204
    (parts obj-0)                                                            ... 205
    (conf-list
        ((minus i.obj-0.term-5) (minus v.obj-0.term-4) v.obj-0.term-3))  ... 2001
    (conf. (h1t v.obj-0.term-3 (minus i.obj-0.term-5)))                  ... 201
    (negligible v.obj-0.term-4))                                         ... 202 ⎭

(def-assumption                                                              ⎫ 210
    h2r                                                                  ... 214
    (parts obj-0 obj-1 obj-2)                                            ... 215
    (conf-list                                                         ⎫ 2100
        (i.obj-0.term-1 i.obj-1.term-1 i.obj-2.term-5)               ... 2101
        ((minus v.obj-1.term-2) v.obj-1.term-1 (minus i.obj-1.term-1))) ... 2102 ⎭
    (conf. (h2r i.obj-2.term-5 v.obj-1.term-1))                          ... 211
    (negligible i.obj-0.term-1)                                          ... 212
    (other-condition (v.obj-1.term-2 . 0)))                              ... 213 ⎭

(def-assumption                                                              ⎫ 220
    h3r                                                                  ... 224
    (parts obj-0 obj-1 obj-2)                                            ... 225
    (conf-list                                                         ⎫ 2200
        ((minus v.obj-0.term-2) v.obj-0.term-1 (minus i.obj-0.term-1)) ... 2201
        (i.obj-0.term-2 i.obj-0.term-1)                              ... 2202
        ((minus v.obj-1.term-2) v.obj-1.term-1 (minus i.obj-1.term-1)) ... 2203
        (i.obj-1.term-2 i.obj-1.term-1)                              ... 2204
        (i.obj-1.term-1 i.obj-0.term-2 i.obj-2.term-3)               ... 2205
        ((minus v.obj-1.term-1) v.obj-2.term-3))                     ... 2206 ⎭
    (conf. (h3r v.obj-0.term-1 (minus v.obj-2.term-3)))                  ... 221
    (negligible v.obj-0.term-2 i.obj-2.term-3)                           ... 222
    (other-condition (v.obj-1.term-2 . 0)))                              ... 223 ⎭

(def-assumption                                                              ⎫ 240
    h4t                                                                  ... 244
    (parts obj-0)                                                        ... 245
    (conf-list
        (i.obj-0.term-4 (minus v.obj-0.term-4) v.obj-0.term-3))      ... 2401
    (conf. (h4t v.obj-0.term-3 i.obj-0.term-4))                          ... 241
    (negligible v.obj-0.term-4))                                         ... 242 ⎭
```

FIG. 7

```
(def-object                                                                  ⎫ 300
    t1
    (slot class       (value transistor))                         ... 301
    (slot V.base      (value +)       (depend-on input))          ... 302
    (slot I.collector (value +)       (depend-on V.t1.base A1.state))) ... 303 ⎭

(def-object                                                                  ⎫ 310
    A1
    (slot class       (value h1t))                                ... 311
    (slot state       (value on)      (depend-on assumption))     ... 312
    (slot obj-0       (value t1))                                 ... 313
    (slot obj-0.term-3 (value t1.base))                           ... 314
    (slot obj-0.term-4 (value t1.emitter))                        ... 315
    (slot obj-0.term-5 (value t1.collector)))                     ... 316 ⎭
```

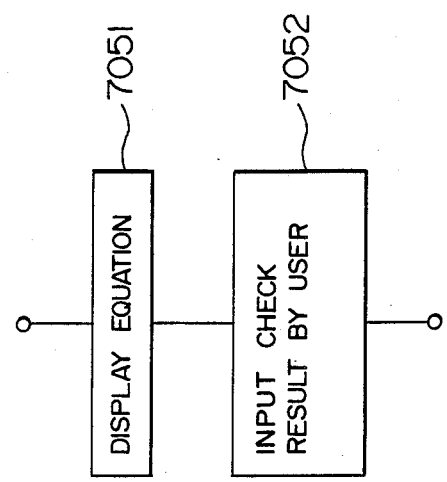
FIG. IIC
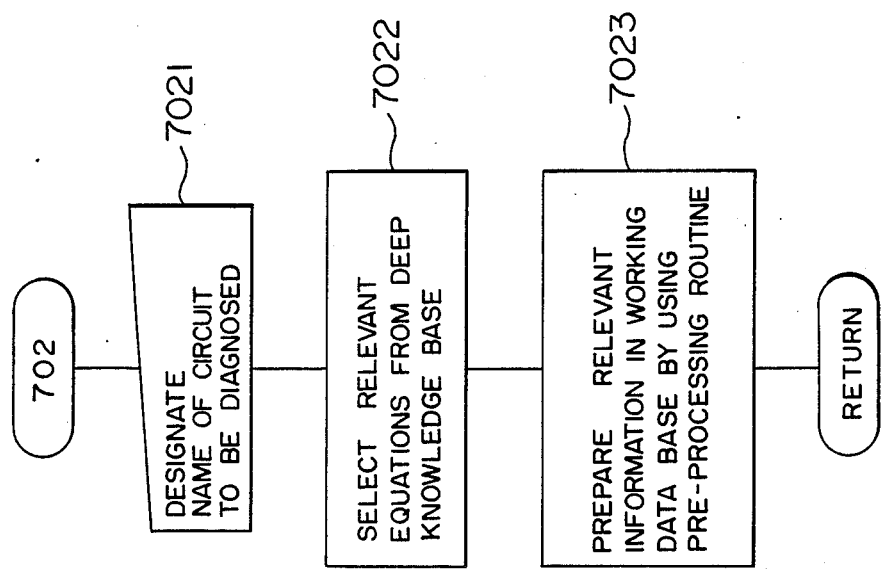
FIG. IIB

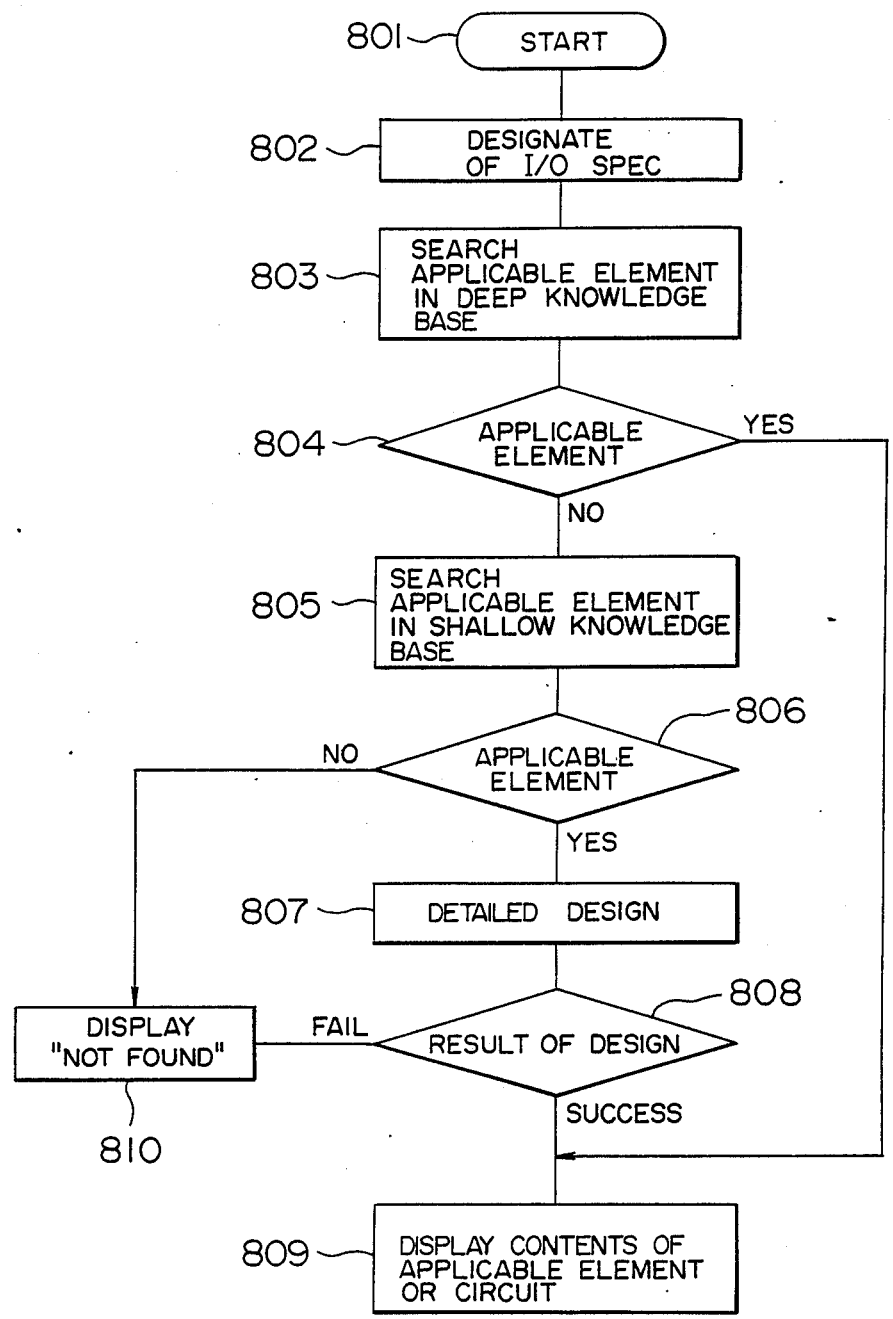

| | | 400 |
|---|---|---|
| 401 | "CONF-LIST" PORTION | $I_E = I_{C_1} + I_R$ |
| 402 | "CONF" PORTION | $I_E = I_R$ |
| 403 | "NEGLECTION" PORTION | $I_{C_1}$ |

FIG. 15A
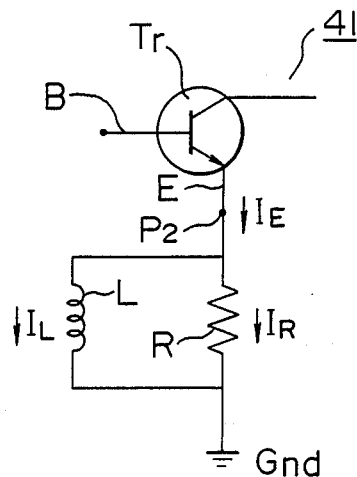
FIG. 15B
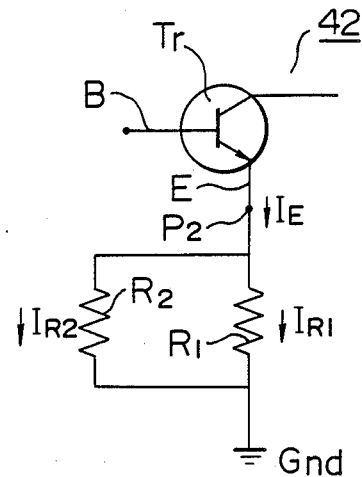
FIG. 16
| | |
|---|---|
| 401'— "CONF-LIST" PORTION | $V_E = V_{C1} = V_R$ ·····(1)<br>$V_{C1} = \frac{1}{\omega C_1} \cdot I_{C1}$ ·····(2)<br>$V_R = R \cdot I_R$ ·····(3)<br>$I_E = I_{C1} + I_R$ ·····(4)<br>$\omega \approx 0$ ·····(5) |
| 402'— "CONF" PORTION | $I_E = I_R$ |
| 403'— "NEGLECTION" PORTION | EQUATION (2), $I_{C1}$ OF EQUATION (4) |
400'

FIG. 17
DEEP KNOWLEDGE BASE

| CONTENTS OF EQUATION | EQUATION NO. |
|---|---|
| $V_E = V_{C1} = V_R$ | (1) |
| $V_{C1} = \frac{1}{\omega C_1} \cdot I_{C1}$ | (2) |
| $V_R = R \cdot I_R$ | (3) |
| $I_E = I_{C1} + I_R$ | (4) |
| $\omega \approx 0$ | (5) |
| $V_{BE} = V_B - V_E$ | (6) |
| $V_{BE} = \text{CONSTANT} \cdot I_E$ | (7) |
| ..... | |

FIG. 18
SHALLOW KNOWLEDGE BASE

| | SHALLOW KNOWLEDGE NO. | SHALLOW KNOWLEDGE BASE | |
|---|---|---|---|
| A | "CONF-LIST" | $V_{BE} = V_B - V_E$ | ...(6) |
| | "CONF." | $V_{BE} = V_B$ | ...(8) |
| | "NEGLIGIBLE" | $V_E$ ; EQUATION (6) | |
| B | "CONF-LIST" | $V = \frac{1}{\omega C_1} \cdot I_{C1}$ | ...(2) |
| | | $\omega \gg 0$ | ...(9) |
| | "CONF" | $V_{C1} = 0$ | ...(10) |
| | "NEGLIGIBLE" | $\frac{1}{\omega C_1} \cdot I_{C1}$ ; EQUATION (9) | |
| | ..... | | |

EXPERT SYSTEM USING DEEP KNOWLEDGE AND SHALLOW KNOWLEDGE

BACKGROUND OF THE INVENTION

1. Field of the Invention

The present invention relates to an expert system, and more particularly to an expert system using both deep knowledge and shallow knowledge.

2. Description of the Prior Art

In order to develop an expert system which utilizes expert knowledge stored in a database and is capable of responding to various questions from users, both deep knowledge for expanding a coverage of the system and shallow knowledge for improving an inference efficiency are important.

In a field of transistor, an example of the deep knowledge is a circuit equation which describes a characteristic of an element such as $$\text{Constant} \times V_{BE} = I_c$$

"A collection current is proportional to a base-emitter voltage"

On the other hand, an example of the shallow knowledge, in the field of transistor is operating knowledge (experiential knowledge) relating to a manner of use of the element such as "Change a base voltage to change a collector current".

The deep knowledge is fundamental knowledge such as a physical rule which exactly describes a principle of operation of the system under consideration. The inference result of the expert system based on the deep knowledge does not include error. However, in the expert system which is based on only the deep knowledge, even if a user inputs a fact that "the base voltage has risen", it cannot infer that "the collector current will increase" unless local information on the emitter voltage is given. If the expert system tries to produce the lacking information that suggests the value of emitter voltage from all related information, the amount of information to be processed is too large to be processed in a practical processing time. As a result, the system may not infer what an expert can infer based on his common sense.

On the other hand, in the expert system which uses the shallow knowledge, it can infer that "the collector current will increase" based on the fact that "the base voltage has risen" inputted by the user. Thus, it can infer what the expert can infer based on his common sense. However, if the volume of knowledge stored in the database is small, it will misinfer that "the collector voltage will increase" even if the emitter voltage has also risen by the same amount, as it infers for the case where only the base voltage has risen.

The qualitative reasoning has been initiated about ten years ago by Hayes, P. J., "The Naive Physics Manifesto", in Michie, D. (ed.) Expert Systems in the Micro-Electronic Age, Edinburgh University Press, Edinburgh, 1979, and Rieger, C. et al. "The Declarative Representation and Procedural Simulation of Causality in Physical Mechanism", Proc. of IJCAI-77, pp. 250-256, 1977, which were intended to model a simple process of understanding by human beings of daily physical phenomenon. Those studies are important in that they are basic techniques for realizing on a computer a mechanism which includes no gap between handlings of the deep knowledge and the shallow knowledge to the objects and the physical phenomena.

The technique of analysis of cause and effect and analysis of object devised by de Kleer ("Qualitative Reasoning-Model of Thinking Based on Common Sense", Association of Artificial Intelligence, Vol. 2, No. 1, pp. 30-43, 1987) is particularly important. By using this technique, it is possible to analyze and predict, on the computer, a behavior of a certain equipment by using equations (corresponding to the deep knowledge) which qualitatively describe laws and rules relating to the behavior of the circuit, and local information. Further, by using rules corresponding to the shallow knowledge, it can perform object analysis of the equipment such as "where two transistors are connected in series, each transistor functions as an amplifier and the combination circuit of the two transistors is also an amplifier". Thus, the technique by de Kleer can be a fundamental technique in developing the system which uses both the deep knowledge and the shallow knowledge.

The technique of knowledge compiler by Yamaguchi (Yamaguchi et al., "Basic Design of Knowledge Compiler Based on Deep Knowledge", Association of Artificial Intelligence, Vol. 2, No. 3, pp. 333-340, 1987) is also important. By using this technique, it is possible to generate shallow knowledge for error diagnostic such as "If a temperature at a point XX series, YY is in error" by using the deep knowledge on the behavior of the equipment such as "Heat is absorbed at one point and the heat is dissipated at another point". Thus it is possible to construct an expert system having a high execution efficiency. This technique can also be a fundamental technique to develop the system which uses both the deep knowledge and the shallow knowledge.

The prior art techniques can handle two-layer knowledge, that is, the deep knowledge and the shallow knowledge but the expressions of the knowledge of the respective layers are the equation in one layer and the "if . . . than . . . " expression in the other layer, or the knowledge on the behavior of equipment in one layer and the knowledge on error diagnostic in the other layer. Thus, there is no consistency therebetween and there is a gap between the handlings of the deep knowledge and the shallow knowledge. As a result, the system cannot handle "shallower knowledge simplified based on shallow knowledge" and hence it is difficult to construct an expert system for an extremely complex equipment which requires a multi-layer knowledge base.

In the expert system, it is an important problem how to collect error-free shallow knowledge which is experiential knowledge of experts.

In order to support the collection of such knowledge, various methods for learning by a computer have been proposed. Among others, Tom M. Mitchell et al., "Explanation-Based Generalization: A unifying View", Machine Learning 1986, pp. 47-80, is important. By using this technique, it is possible to generate a theorem (shallow knowledge) useful to solve a problem based on a user-inputted case where a problem was solved and an axiom (deep knowledge) relating to the problem. However, this learning method intends to generate a consistent theorem from a consistent axiom, and it cannot be used in learning knowledge containing contradiction which is required in solving common problems, as stated in the reference (Section 4.2.1 on pages 68-70). For example, in the field of electrical circuit, if "the base voltage has risen" and "the emitter voltage has risen more", the shallow knowledge infers that "the collector current will increase" but the deep knowledge infers that "the collector current will decrease". Thus, the deep knowledge and the shallow knowledge are contradictory to each other and the above explanation-based generalization technique cannot be used.

SUMMARY OF THE INVENTION

It is an object of the present invention to provide an expert system which uses both deep knowledge and shallow knowledge.

It is another object to provide a method for generating new shallow knowledge to be stored in a knowledge base based on knowledge already stored in the knowledge base and newly supplied information.

In order to achieve the above objects, the present invention is characterized by uniform handling of experiential knowledge which is essential in constructing a practical expert system, that is, a part of shallow knowledge relating to a representative behavior of an object to be inferred (equipment), and basic knowledge such as physical rules and circuit equations applicable to the object to be inferred, that is, deep knowledge.

The expert system of the present invention comprises a deep knowledge base for storing deep knowledge relating to an object to be inferred, a shallow knowledge base for storing shallow knowledge relating to a representative behavior of the object to be inferred, a working database, and an inference engine. The shallow knowledge neglects a portion of content of the deep knowledge necessary for the explanation of the representative behavior of the object to be inferred so that the structure is simplified.

The deep knowledge stored in the deep knowledge base may comprise an object name which identifies an object (device, circuit or element) to which the knowledge relates, and information indicating components of the object, for example, at least one equation relating to the behavior indicating voltage and current relationships among the components. Where the object comprises a plurality of devices or elements, the deep knowledge further includes information indicating the connection of those devices or elements.

On the other hand, the shallow knowledge stored in the shallow knowledge base may comprise an object name indicating the name of knowledge, information indicating components of the object, at least one concluding equation relating to a representative behavior of the object, and at least one conditional equation relating to the object which indicates an environment in which the concluding equation is met. In accordance with the present invention, the concluding equation has a form prepared by neglecting a portion of items contained in the conditional equation, and the shallow knowledge further includes information indicating the items neglected, or the equations neglected by the user.

The conditional equation is selected from the equations stored in the deep knowledge base or the equations in the shallow knowledge stored in the shallow knowledge base, and the concluding equation corresponds to the content of experiential rules taught by the user.

In the expert system of the present invention, if the inference does not go well for a certain problem, the shallow knowledge is automatically generated based on the behavior of the equipment inputted by the user in response to a request from the expert system. When the behavior of the equipment is taught, an equation which matches to the given behavior if a portion thereof is neglected is selected from the knowledge stored in the deep knowledge base and the shallow knowledge base, and it is combined with other information relating to the behavior to form new shallow knowledge, which is then added to the shallow knowledge base.

The generated shallow knowledge has its object names and component names represented by generalized symbols in order to expand an application area thereof.

Since the expert system of the present invention has a common expression in the deep knowledge and the shallow knowledge, it is possible to predict a behavior of the equipment by combining the knowledge in the deep knowledge base and the shallow knowledge base. Thus, a behavior of the equipment which heretofore has not been predicted based on only the deep knowledge because of insufficient information or insufficient processing time can be predicted. Further, a phenomenon which cannot be predicted in detail based on only the shallow knowledge can be predicted by using the shallow knowledge and the corresponding deep knowledge. Furthermore, by predicting the behavior of the equipment based on the information in the deep knowledge base and the shallow knowledge base, comparing it with an actual behavior and identifying an error location based on a difference between the prediction and the actual behavior, the error which may be misdiagnosed based on only the shallow knowledge can be exactly identified by using the shallow knowledge and the corresponding deep knowledge. By inputting a specification of the equipment, retrieving the information stored in the deep knowledge base and the shallow knowledge base and detecting the behavior stored in the knowledge bases which matches to the specification, the equipment can be designed.

The foregoing and other objects, advantages, manner of operation and novel features of the present invention will be understood from the following detailed description when read in connection with the accompanying drawings.

BRIEF DESCRIPTION OF THE DRAWINGS

FIG. 3 shows a structure of knowledge stored in a deep knowledge base 1, FIG. 4 shows a structure of knowledge stored in a shallow knowledge base 2, FIG. 7 shows an example of content of a working database 3, FIGS. 11A–11C show flow charts of an execution process of a diagnosis program 7, FIG. 12 shows a flow chart of an execution process of a design program 8, FIGS. 15A and 15B show circuit diagrams of other electrical circuits having similar structures to that of the electrical circuit 40, FIG. 16 shows a structure of shallow knowledge 40' having an improved content over that of the shallow knowledge 400 shown in FIG. 14, FIG. 17 shows a content of the deep knowledge base 1 for illustrating a method of generating the shallow knowledge 400', and FIG. 18 shows a content of the shallow knowledge base 2 for illustrating a method for generating the shallow knowledge 400'.

DETAILED DESCRIPTION OF THE PREFERRED EMBODIMENTS

Figure 1:
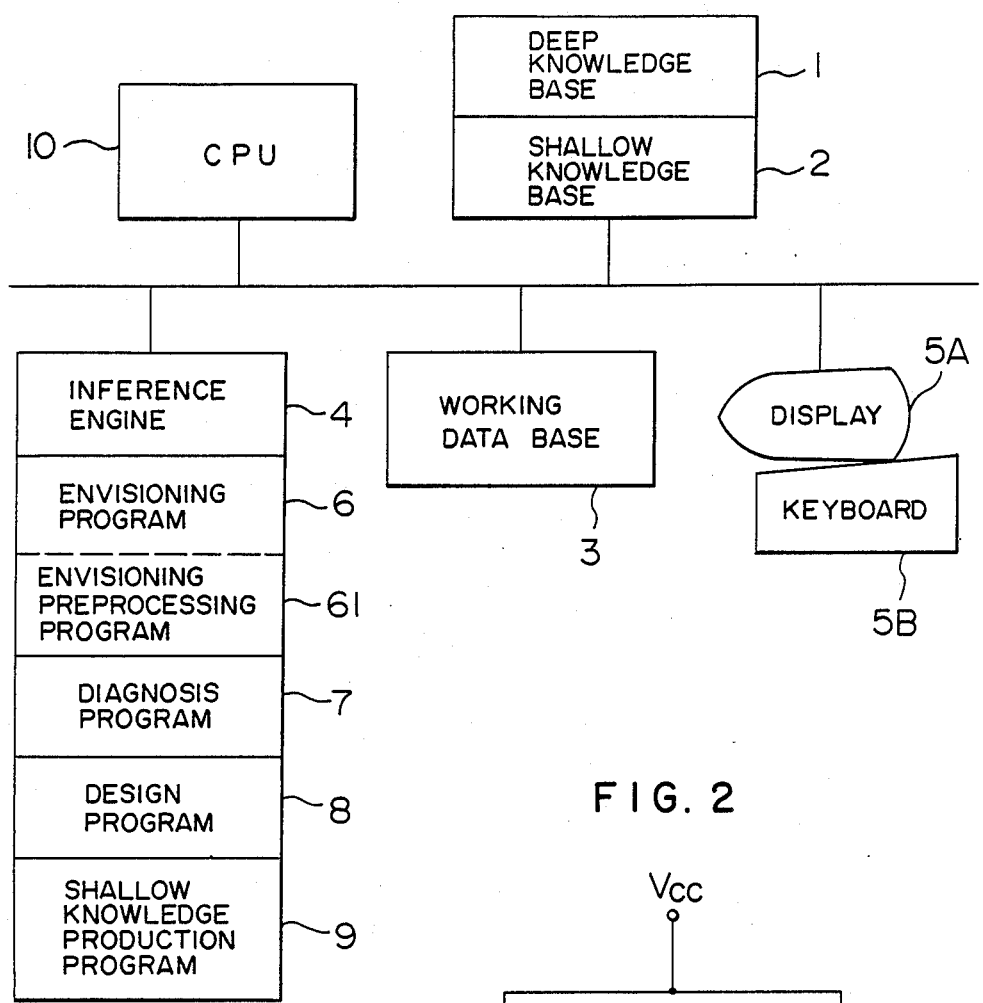
FIG. 1 shows a block diagram of a configuration of an expert system of the present invention.

FIG. 1 shows a configuration of one embodiment of an expert system of the present invention. Numeral 1 denotes a deep knowledge base which stores therein deep knowledge which is basic knowledge relating to a construction of an equipment which is an object of inference and a behavior of the equipment. Numeral 2 denotes a shallow knowledge base which stores therein shallow knowledge which is experiential rules generated based on the content of the deep knowledge base 1 and user-supplied information. Numeral 3 denotes a working database which is formed on a memory such as magnetic disk or semiconductor memory. Numeral 6 denote a program (envisioning means) for analyzing and envisioning a behavior of the equipment based on the information stored in the deep knowledge base 1 and the shallow knowledge base 2. Numeral 61 denotes a program (preprocessing means) for preparing the execution of the envisioning means 6. Numeral 7 denotes a program (diagnosis means) for analyzing and envisioning the behavior of the equipment based on the information stored in the deep knowledge base 1 and the shallow knowledge base 2, comparing the envisioned behavior with an actual behavior, and identifying an error location based on a difference between the envisioned behavior and the actual behavior. Numeral 8 denotes a program (design means) for retrieving information from the deep knowledge base 1 and the shallow knowledge base 2 to select the behavior stored in the knowledge bases which matches to the specification as a design product. Numeral 9 denotes a program (shallow knowledge production means) for retrieving information from the deep knowledge base (and the shallow knowledge base 2, selecting a behavior which matches to the user-input behavior if a portion thereof is neglected, and storing the selected behavior into the shallow knowledge base 2 as new shallow knowledge or an experiential rule. Numeral 4 denotes a program which acts as an inference engine for selectively activating the envisioning means 6, the diagnosis means 7 and the design means 8 in accordance with a user direction. Numeral 5A denotes a display and numeral 5B denotes a keyboard for inputting data and commands. Numeral 10 denotes a CPU for executing the programs of the inference engine 4, envisioning means 6, preprocessing means 61, diagnosis means 7, design means 8 and shallow knowledge production means 9.

Figure 2:
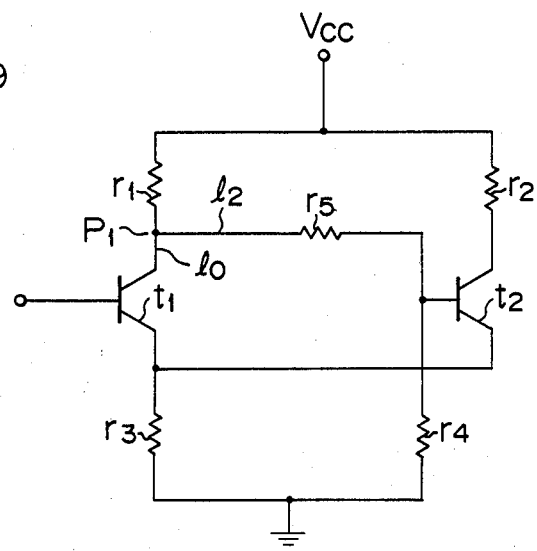
FIG. 2 shows a circuit diagram of a Schmit trigger which is an example of an equipment which is an object of inference.

FIG. 2 shows a Schmit trigger circuit as an example of the electrical circuit shown to explain a specific operation of the present invention. The Schmit trigger circuit comprises two transistors t1 and t2 and five resistors r1, r2, r3, r4 and r5.

FIG. 3 shows an example of data structure stored in the deep knowledge base 1. When the equipment which is the object of inference is to Schmit trigger circuit shown in FIG. 2, information 100 relating to the behavior of the transistors, information 110 relating to the behavior of the resistors and information 120 relating to the Schmit trigger circuit are stored in the deep knowledge base 1.

For example, as to the information 100 relating to the behavior of the transistors, a statement "defcircuit transistor . . . " 1010 represents that the following information 1001–1005 relate to the transistors, a statement "(parts . . . )" 1001 represents information of the components, that is, the transistor has base, emitter and collector terminals, and a statement "(conf. . . )" 101 (which is an abbreviation of confluence) represents that the following information 1002–1005 represent equations relating to the behavior of the transistors.

In more detail, the Kirchhoff's law of current reservation is met for the currents flowing into the three terminals of the transistor. The information relating to this low is described by a statement 1005

(KCL I. collector I. emitter I. base)

where KCL in a name of equation, "I. collector" is a differentiation of a current flowing into the transistor through the collector, "I. emitter" is a differentiation of a current flowing into the transistor through the emitter, and "I. base" is a differentiation of a current flowing into the transistor through the base. As a whole, a one-order differentiation of the formula representing the Kirchhoff's law of current reservation, with all constants being substituted by "1" is represented. The formula representing the Kirchhoff's law of current reservation is given by $$1*I.\text{collector}+1*I.\text{emitter}+1*I.\text{base}=0$$

The one-order differentiation of this formula is represented by $$1*\partial I.\text{collector}+1*\partial I.\text{emitter}+1*\partial I.\text{base}=0$$

By substituting all constants by "1" (in the above formula, the constants are all "1" by chance), we get $$\partial I.\text{collector}+\partial I.\text{emitter}+\partial I.\text{base}=0$$

The differentiation symbols $\partial$ are omitted, all data names are listed and names are prefixed so that the statement 1005 of FIG. 3 is obtained. Similarly, the fact that a difference between a base voltage "V.base" and an emitter voltage "V.emitter" of the transistor is proportional to the collector current "I.collector" is expressed by the statement 1002.

(C.Flow V.base(minus V.emitter)(minus I.collector))

where C.Flow is a name of equation.

The information 110 relating to the behavior of resistors comprises a statement 1110 which indicates that the following information relate to the resistors, a component statement indicating that the resistor has nodes N1 and N2, and an equation 111 relating to the behavior of the resistors. The equation 111 relating to the behavior of the resistors includes an equation 1102 representing the Kirchhoff's law of current reservation for the nodes N1 and N2 and an equation 1103 representing the Ohm's law.

The information 120 relating to the Schmit trigger includes a statement 1210 indicating that the following information relate to the Schmit trigger circuit, a statement 1201 indicating the components of the Schmit trigger circuit, information 122 (1221-1227) described following to "(conn.)" indicating a connection relationship of the components in the Schmit trigger circuit, and information 121 (1202-1203) indicating equations relating to the behavior inherent to the Schmit trigger circuit.

The information 122 indicating the connection relationship of the components, for example, the statement 1226 is stored in the form of (Node 6 Vcc r1. N2 r2. N2)

where the connection name "Node 6" and the terminal name "Vcc, r1, N1, r2, N2" are serially arranged. The statement 1226 indicates that the N2 terminal of the resistor r1 and the N2 terminal of the resistor r2 are connected to a power supply Vcc, and the connection thereof is referred as Node 6. The connection information is equivalent to the designation of the equations which represent that the Kirchhoff's law of current reservation is met at each connection and the voltages are equal. Namely, (Node 6 Vcc r1. N2 r2. N2)

in the statement 1226 is equivalent to the designation of the equation of the Kirchhoff's law of current reservation (KCL I.Vcc I.r1. N2 I.r2. N2)

and the equations of voltages (V V.Vcc (minus V.r1.N2))

(V V.Vcc (minus V.r2.N2))

"(Const V.Vcc)" and "(Const V.Gnd)" in the statements 1202 and 1203 indicate that the voltage changes in the power supply and the ground are zero. Thus, the above voltage equations indicate that the voltage changes at the terminal N2 of the resistor r1 and the terminal N2 of the resistor r2 are zero.

As described above, the deep knowledge base 1 includes the information relating to the components "(parts . . . )" of the equipment (device, circuit or system) which is the object of inference, the connection relationship "(conn. . . . )" among the components, and the equations "conf . . . " representing the behaviors of the equipment and the components.

In order to briefly describe a mechanism of the invention, it is assumed here that a retrieval subroutine which is used by the programs (envisioning means 6, preprocessing means 61, diagnosis means 7, design means 8 and shallow knowledge production means 9) for retrieving data from the deep knowledge base 1, automatically converts the connection information to the equation of the Kirchhoff's law of current reservation or the equation of voltages. Thus, when the equation of voltages is retrieved, an equivalent equation of voltages is automatically prepared based on the connection information stored in the deep knowledge base and it is handled as if it were the original equation of voltages. Similarly, when the current equation is retrieved, an equation of the Kirchhoff's low of current reservation is automatically prepared based on the connection information. Such a mechanism can be readily realized by incorporating the fact that the Kirchhoff's law of current reservation is met at each connecting point and the voltages at two directly connected points are equal, into a retrieval logic of the retrieval subroutine by utilizing a conditional branch function of a programming language.

FIG. 4 shows a content of the shallow knowledge stored in the shallow knowledge base 2. When the expert system relates to the Schmit trigger circuit shown in FIG. 2, the shallow knowledge base 2 contains, for example, knowledges 200 and 240 relating to transistors and knowledges 210 and 220 relating to resistors. The shallow knowledge comprises a plurality of statements beginning with "(def-assumption)", and "h1t" 204, "h2r" 214, "h3r" 224 and "h4t" 244 represent names of knowledges. In FIG. 4, symbols "obj-0", "obj-1" and "obj-2" represent names of components used in the deep knowledge base, such as those corresponding to base, emitter and collector. They are automatically generated by the shallow knowledge production program 9, as will be explained later. Similarly, "term-1", "term-2", . . . , "term-5" represent names of terminals which are automatically generated by the shallow knowledge production program.

The shallow knowledge comprises "conf-list" portions corresponding to an "if" portion (condition portion) in a rule represented by an "if . . . then . . . " format, for example, 2001, 2101, 2102, 2201-2206, 2401, and "conf" portions corresponding to a "then" portion (conclusion portion), for example, 201, 211, 221, 241, neglection portions representing conditions and other items neglected in deriving the conclusion portions, for example, 202, 212, 222 and 242, and other condition portions indicating other information relating to the knowledge, which may be described occasionally, for example, 213 and 223.

The shallow knowledge shown in FIG. 4 is described in further detail. The shallow knowledge 200 was derived from the equation 1002 of FIG. 3 which indicates that the collector current Ic of the transistor is proportional to the difference between the base voltage $V_B$ and the emitter voltage $V_E$. The statement 2001 described in the "conf-list" portion (condition portion) in the knowledge 200 represents the same equation as the equation 1002 when the symbol "object-0" corresponds to the transistor, and "term-3", "term-4" and "term-5" correspond to the base, emitter and collector, respectively. The conf. portion (conclusion portion) 201 in the knowledge 200 represents the equation which indicates that the base voltage "V.obj-0. term-3" of the transistor is proportional to the collector current "i.obj-0. term 5". The above conclusion is valid when the emitter voltage "V.obj-0. term 4" of the transistor is neglected in the equation 2001 as shown by the statement "neglection" 202. Thus, the shallow knowledge 200 represents a new equation (one assumption) relating to a representative behavior of the transistor obtained by neglecting a portion of the equation 2001 relating to the behavior of the transistor. Similarly, "def-assumption h2r . . . " 210 relates to the behavior of the resistor r1 shown in FIG. 2 and it represents that a current (i.obj-2. term-5) taken from one end P1 (obj-1. term-1) of the resistor r1 having the other end thereof (obj-1. term-2) connected to a power supply or ground (v.obj-1. term-2.0) into one end of a first signal line $l_2$ is proportional to a voltage (V.obj-1. term-1) at the one end $P_1$ of the resistor $r_1$ if a current (i.obj-1. term-1) of a signal line $l_0$ is neglected. "Other-condition" 213 represents that a terminal voltage (v.obj-1, term-2) of the resistor connected to the power supply or ground does not change. Similarly, "(def-assumption h3r . . . " 220 describes an equation relating to the behavior of the resistor, which represents that one end (obj-1. term-2) of series-connected resistors (obj-0, obj-1) is connected to the power supply or ground, and the voltage at the other end is changed to change a voltage (v.obj-2. term-3) at a terminal connected to an intermediate point. "(Def-assumption h46 . . . " 240 describes an equation relating to the behavior of the transistor, which represents that the base voltage (v.obj-0. term-3) of the transistor (obj-0) is changed to change the emitter current (i.obj-0. term-4).

Figure 5:
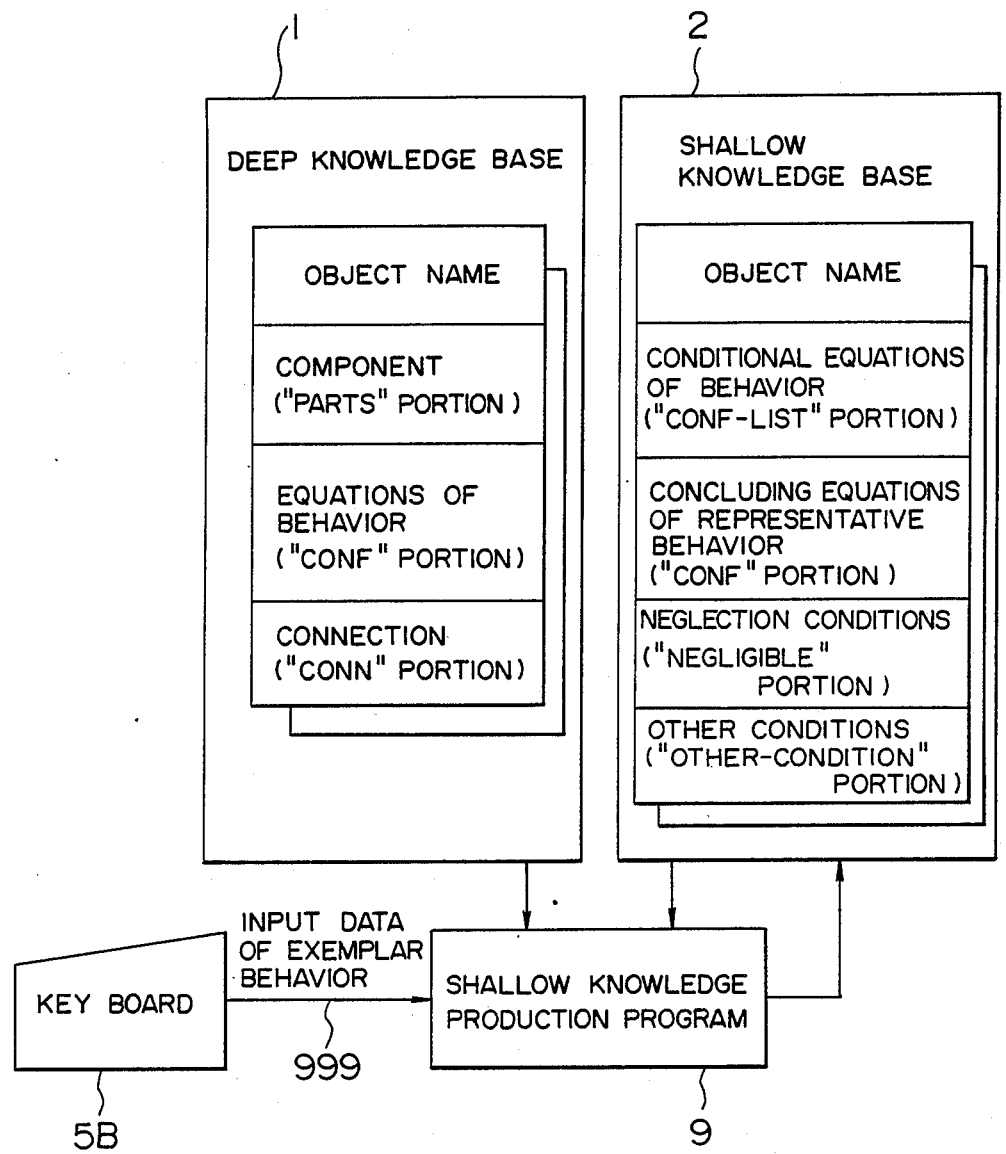
FIG. 5 shows an input/output relationship of a shallow knowledge production program.

FIG. 5 shows an input/output relationship of the shallow knowledge production program 9. When the inference engine 4 starts the shallow knowledge production program 9 in response to a user direction, the shallow knowledge production program 9 generates the equation (for example, 210 in FIG. 4) relating to a new representative behavior based on the equation (for example 1002, 1003 in FIG. 3) relating to the behavior stored in the deep knowledge base 1 and/or the equation (for example, 201 in FIG. 4) relating to the representative behavior stored in the shallow knowledge base 2, in response to the data representing the exemplar behavior inputted by the user through the keyboard 5B, in accordance with the process shown in FIG. 6, and stores the generated equation into the shallow knowledge base 2.

Figure 6:
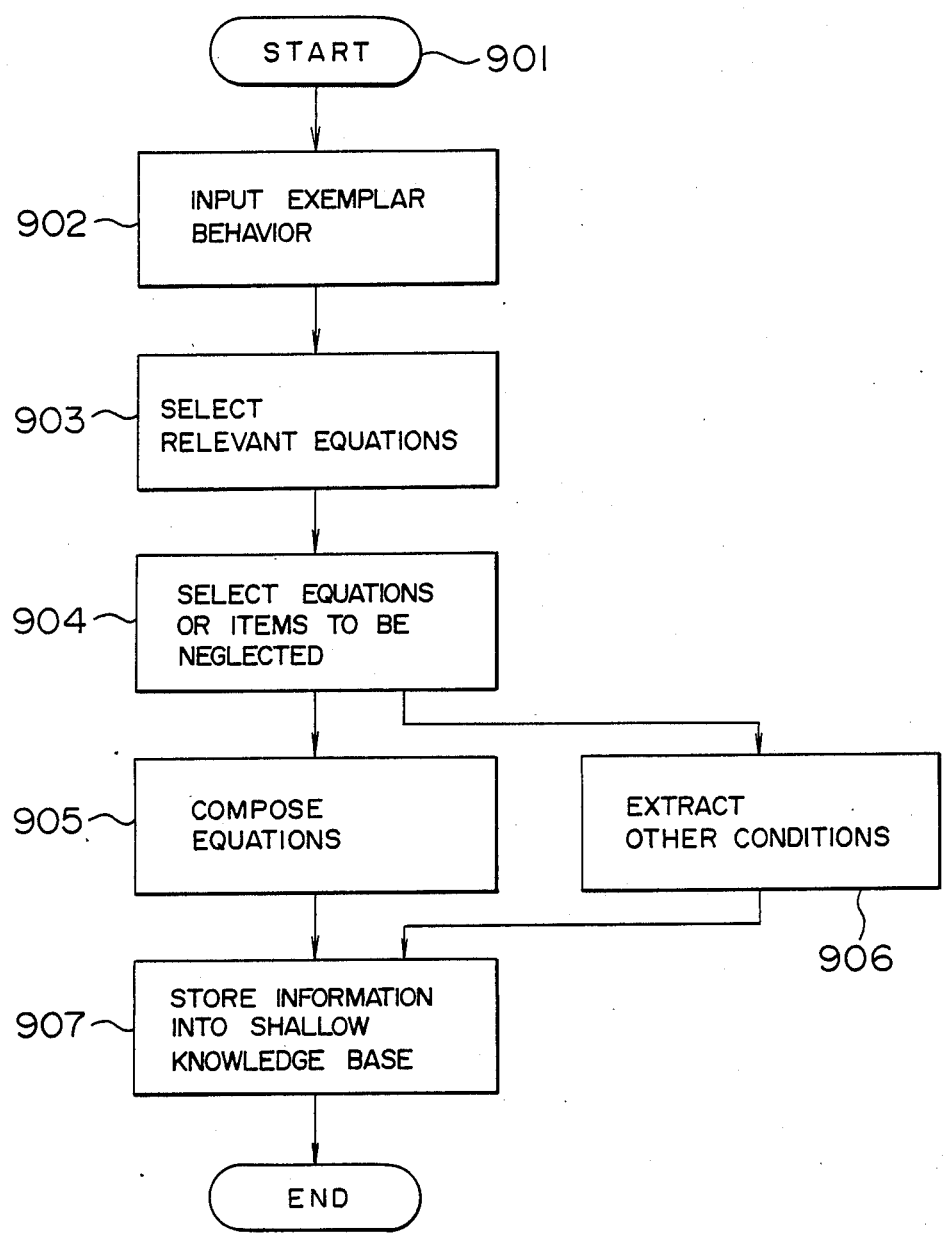
FIG. 6 shows a flow chart of an execution process of the shallow knowledge production program 9.

FIG. 6 shows an execution process of the shallow knowledge production program 9. When the inference engine 4 starts the shallow knowledge production program 9 in response to the user direction or by the decision of the inference engine 4, the user first inputs data representing the exemplar behavior of the circuit (step 902). Assuming that the user inputs the information representing that if the base voltage of t1 is raised, then the collector current of t1 increases, as the exemplar behavior of the circuit under a condition that no data has been stored in the shallow knowledge base 2, the program 9 retrieves from the equations relating to the behavior of the circuit stored in the deep knowledge base 1 an equation which matches to the exemplar behavior inputted by the user if a certain term in the equation is neglected (step 903).

The process for selecting the equation relating to the event inputted by the user is essentially identical to "Explain" in the first step of the EBL method described in Section 2.2 (page 52) of the reference by Tom M. Mitchell et al. described above. The present invention differs from the reference in that it neglects the certain term of the equation.

In the equation (1002 in FIG. 3) relating to the transistor in the deep knowledge base 1

(C.Flow V.base (minus V.emitter)(minus I.collector))

if the term of the emitter is neglected, the behavior of the circuit calculated from the equation matches to the user input. Thus, the term V.emitter is eliminated from the equation 1002 (step 904) and the name hlt is attached to prepare a new equation (hlt V.base (minus I.collector))

The name "obj-0" which was renamed by utilizing the order of occurrence in the equation is used instead of the actual "t1" as the component name, and the names "term-3", "term-4" and "term-5" which were renamed by utilizing the order of occurrence are used instead of the actual base, emitter and collector, as the terminal names to prepare the equation (hlt V.obj-0, term 3 (minus I.obj-0, term-5))

(step 905). This equation is stored into the shallow knowledge base 2 as the statement 201 of FIG. 4 (step 907). The name hlt may be automatically assigned by using the order of occurrence so long as it is distinguishable in the shallow knowledge base 2. It may be a data number. In the following description, the name hlt is used for the sake of convenience. In the step 907, the component names and terminal names of the equation (1002 in FIG. 3)

(C.Flow V.base (minus V.emitter)(minus I.collector))

which is the base for the equation hlt are also renamed in the similar process and the name "C.Flow" is omitted to prepare an equation ((minus i.obj-0. term-5)(minus v.obj-0. term-4) v.obj-0. term-3

This equation is stored into the shallow knowledge base 2 as the statement 2001. The neglected term V.emitter is also renamed and it is stored into the shallow knowledge base 2 as the statement 202. The appeared components are stored into the shallow knowledge base 2 as the statement 205 of FIG. 4.

It is now assumed that, under the condition that only the statement 200 of FIG. 4 has been stored in the shallow knowledge base 2, the user inputs the data representing that "if the collector current of t1 increases, then the collector voltage of t1 falls, as the next exemplar behavior of the circuit (999 in FIG. 5). For this exemplar behavior, the data relating to h2r (210 in FIG. 4) of the shallow knowledge base 2 can be prepared from the equation (1103 of FIG. 3) relating to the behavior of the resistor of the deep knowledge base 1, by neglecting the change in the current flowing into the resistor r5 of the Schmit trigger circuit. In the present example, the fact that the change in the voltage at the terminal of the resistor r1 connected to the power supply is zero is used during the calculation of the equation, as other condition. It is extracted as "other-condition" (213 in FIG. 4) and stored into the shallow knowledge base 2 (step 907).

In the present example, only the information in the deep knowledge base 1 is used to store the new information into the shallow knowledge base 2. If an equation which matches to the exemplar behavior inputted by the user if a particular condition in the equation is neglected is in the shallow knowledge base 2, the new information to be stored into the shallow knowledge base 2 may be prepared by using the information of the shallow knowledge base 2.

FIG. 7 shows a typical content stored in the working database 3. When the object is the Schmit trigger circuit shown in FIG. 2, specific information 300 relating to individual components, for example, information 301 which represents that t1 is a transistor, information 302 which represents that the base voltage of t1 is rising, and information 310 relating to behaviors of individual components, for example, information 311 which represents that the concluding equation of hlt stored in the shallow knowledge base 2 is applicable to the component t1 313 are stored in the working database 3. "(Defobject t1 . . . " 300 represents the information of the input transistor t1 of the Schmit trigger circuit, "(slot class . . . " 301 represents that t1 is a transistor, "(slot V.base . . . " 302 represents that the base voltage of t1 rises depending on the input designation by the user, that is, the user has directed the rise of the base voltage of t1, "slot I.collector . . . 303 represents that the collector current of the transistor t1 increases by the rise of the base voltage of t1 and depending on the assumption A1 relating to the equation for the representative behavior of the transistor, and "(def-object A1 . . . " 310 represents the assumption relating to the input transistor of the Schmit trigger circuit that the information hlt relating to the equation for the representative behavior of the transistor is applicable to the input transistor of the Schmit trigger circuit. The equation hlt relating to the behavior of the transistor is based on the assumption that the change in the emitter voltage can be neglected. A1 is the assumption. "(Slot state . . . " 312 represents that the assumption A1 is now adopted, "(slot obj-0 . . . " 313 represents that obj-0 of the equation hlt is the transistor t1, "(slot obj-0. term 3 . . . " 314 represents that obj-0. term-3 of the equation hlt is the base of the transistor t1, and "(slot obj-0. term-4 . . . " 315 represents that obj-0. term-4 of the equation hlt is the emitter of the transistor t1.

Figure 8:
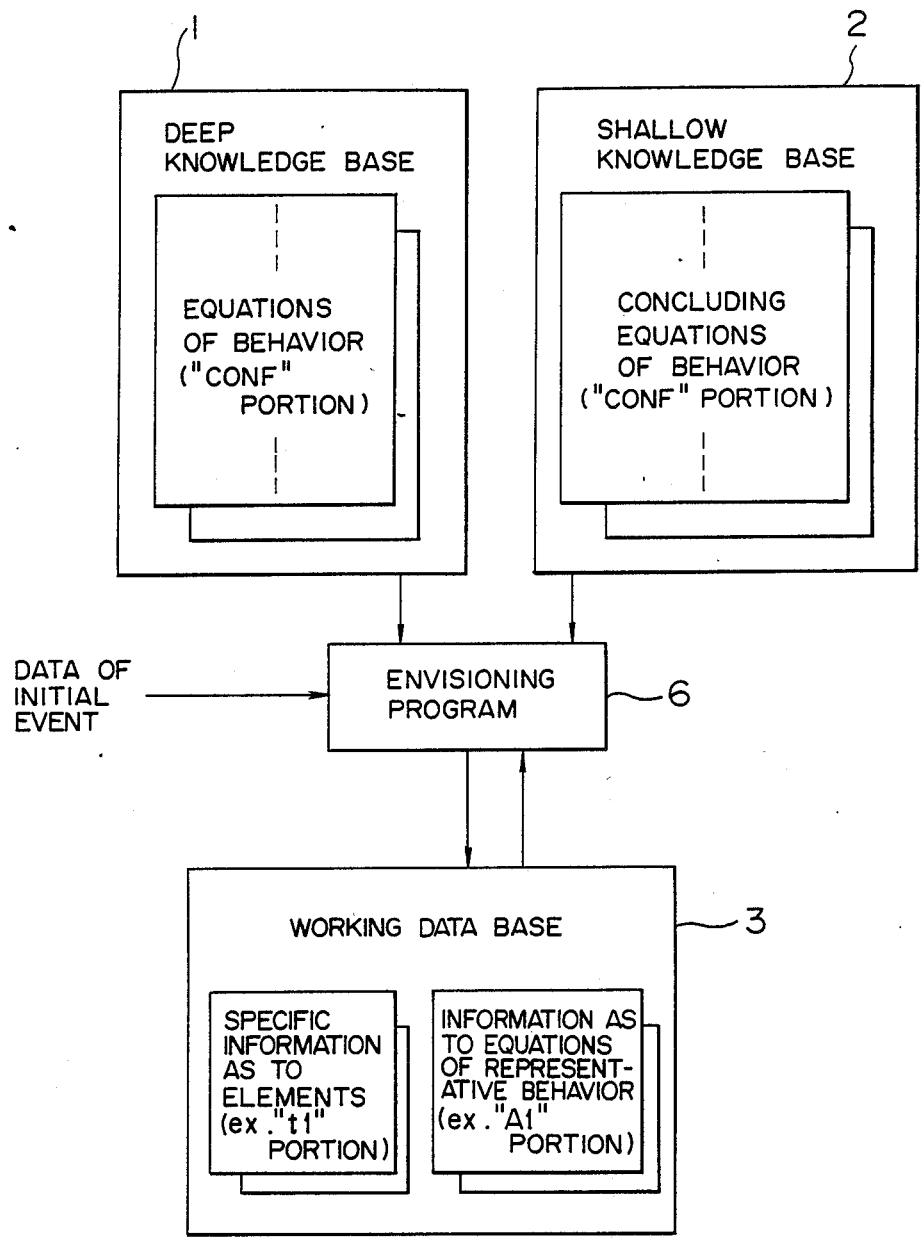
FIG. 8 shows an input/output relationship of an envisioning program 6.

FIG. 8 shows an input/output relationship of the envisioning program 6. When the inference engine 4 starts the envisioning program 6 in response to the user direction, the envisioning program 6 newly prepares specific information relating to the component (for example, 303 in FIG. 7) based on the equations relating to the behavior (for example, 1002 and 1003 in FIG. 3) stored in the deep knowledge base 1, the equation relating to the representative behavior (for example, 201 in FIG. 4) stored in the shallow knowledge base 2 and the specific information relating to the components (for example, 302 in FIG. 7) stored in the working database 3, in response to the initial event 611 inputted by the user, in accordance with the process shown in FIG. 9, and stores the new information into the working database 3.

Figure 9:
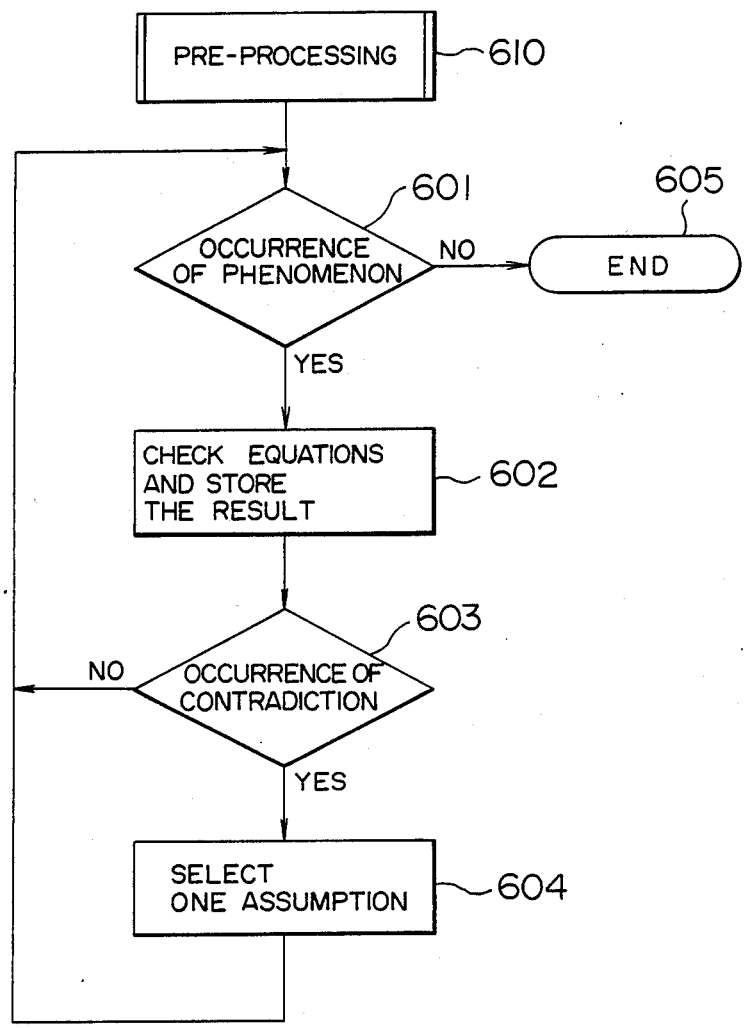
FIG. 9 shows a flow chart of an execution process of the envisioning program 6.
Figure 10:
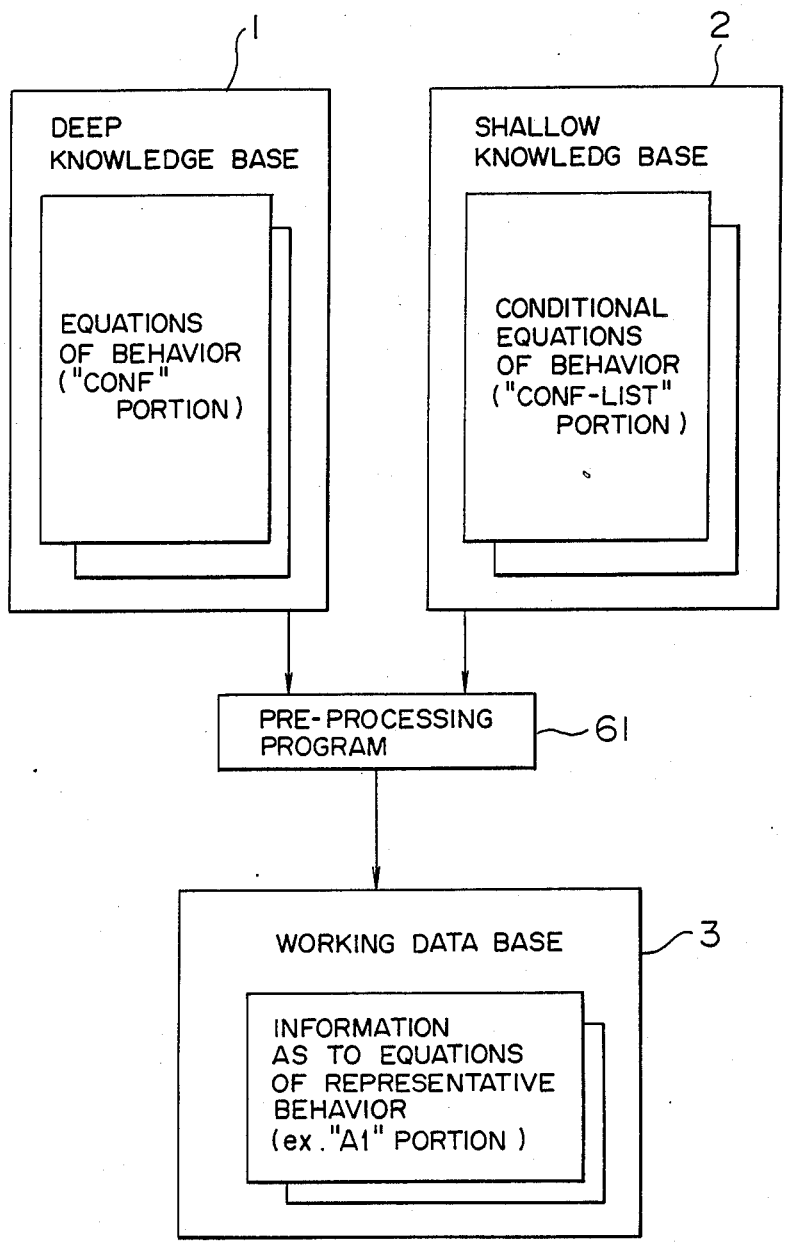
FIG. 10 shows a flow chart indicating an input/output relationship of a preprocessing program 61.

FIG. 9 shows an execution process of the envisioning program 6. When the inference engine 4 starts the envisioning program 6, the preprocessing program 61 is first started (step 610). FIG. 10 shows a representative input/output relationship of the preprocessing program 61. The preprocessing program 61 prepares specific information relating to the individual components (for example, 310 in FIG. 7) based on the initial event 611 inputted by the user, the equation relating to the behavior (for example, 100 in FIG. 3) stored in the deep knowledge base 1, and the equation relating to the representative behavior (for example, 200 in FIG. 4) stored in the shallow knowledge base 2, and stores the prepared information into the working database 3.

Specifically, the preprocessing program 61 retrieves the "conf. list" portions (2001, 2100, 2200, 2401 in FIG. 4) stored in the shallow knowledge base 2. For example, the equation relating to the input transistor t1 of the Schmit trigger circuit is equal to an equation derived by substituting obj-0 of the "conf-list" 2001 by t1, obj-0. term 3 by t1.base, obj-0. term-4 by t1.emitter, and obj-0. term 5 by t1.collector. The preprocessing program 61 stores the content of the specific conf-list into the working database 3. The content A1 (310 in FIG. 7) of the working database 3 was prepared by the preprocessing program.

The envisioning program 6 then checks the occurrence of phenomenon in accordance with the process of FIG. 9 (step 601). It is assumed that the user directs the rise of the voltage at the input terminal V.base of the Schmit trigger circuit. In 302 of FIG. 7, (def-object t1 . . . (slot V.base . . .

represents the current content of the working database 3, where+ indicates the rise of voltage.

In accordance with the process of FIG. 9, the deep knowledge base 1, the shallow knowledge base 2 and the working database 3 are then searched for useful equation relating to the behavior of the equipment (step 602). In the present example, it is determined from the information A1 that the equation hlt (201 in FIG. 4) is usable. Thus, the current flowing into the collector of the input transistor is calculated and it is stored into the working database 3 (step 602). In this case, if a sum of data listed in 201 of FIG. 4 is to be rendered zero, i.obj-0. term-5 (current flowing into the collector of t1) also increases (+) because V.obj-0. term-3 (base voltage of t1) is +. The statement 303 in FIG. 7 is an example of content stored in the working database 3 in this step. In the statement 303, (depend-on . . . ) represents that I.collector depends on V.base and A1.state, and it is not valid if one of them varies.

The envisioning program 6 regards the result calculated by the equation as occurrence of a new phenomenon, and repeatedly uses the above equation. In the present example, the inference is sequentially processed such that 210 of FIG. 4 infers that "the collector voltage of the input transistor falls", 220 infers that "the base voltage of the output transistor falls", 210 infers that "the current flowing into the collector of the output transistor decreases", and 240 infers that "the collector voltage of the output transistor rises".

As the inference proceeds in this manner, 250 of FIG. 4 infers that "the current flowing out of the emitter of the input transistor increases" and "the current flowing out of the emitter of the output transistor decreases". Based on the above and the information given by 240 of FIG. 4, "the current is taken from one end of the resistor having the other end connected to the power supply or ground to "change the voltage at the one end of the resistor", two contradictory conclusions, "the emitter voltage of the input (output) transistor rises" and "the emitter voltage of the input (output) transistor falls" are obtained. The envisioning program 6 checks the occurrence of contradiction in accordance with the process of FIG. 9 (step 603) and select one of the conclusions (step 604). In the selection step, the information described at "depend-on" of the statement on which the contradictory data is based is examined. In the present example, the first conclusion is based on the assumption that "the voltage at the terminal of the resistor r3 changes due to the increase of the current flowing out of the emitter of the input transistor", and the second conclusion is based on the assumption that "the voltage at the terminal of the resistor r3 changes due to the decrease of the current flowing out of the emitter of the output transistor". It is determined that those are assumptions because the content of depend-on is "assumption". In the selection step 604, the user is asked which one of the assumptions he adopts, and the state of the non-selected assumption is turned off. It is now assumed that the assumption "the voltage at the terminal of the resistor r3 changes due to the increase of the current flowing out of the emitter of the input transistor" is not selected and the assumption "the voltage at the terminal of the resistor r3 changes due to the decrease of the current flowing out of the emitter of the output transistor" is selected. Then, the data which is based on the non-selected assumption, that is, "the emitter voltage of the input (output) transistor increases" is deleted from the working database 3 by the dependency directed backtracking method.

Figure 11A:
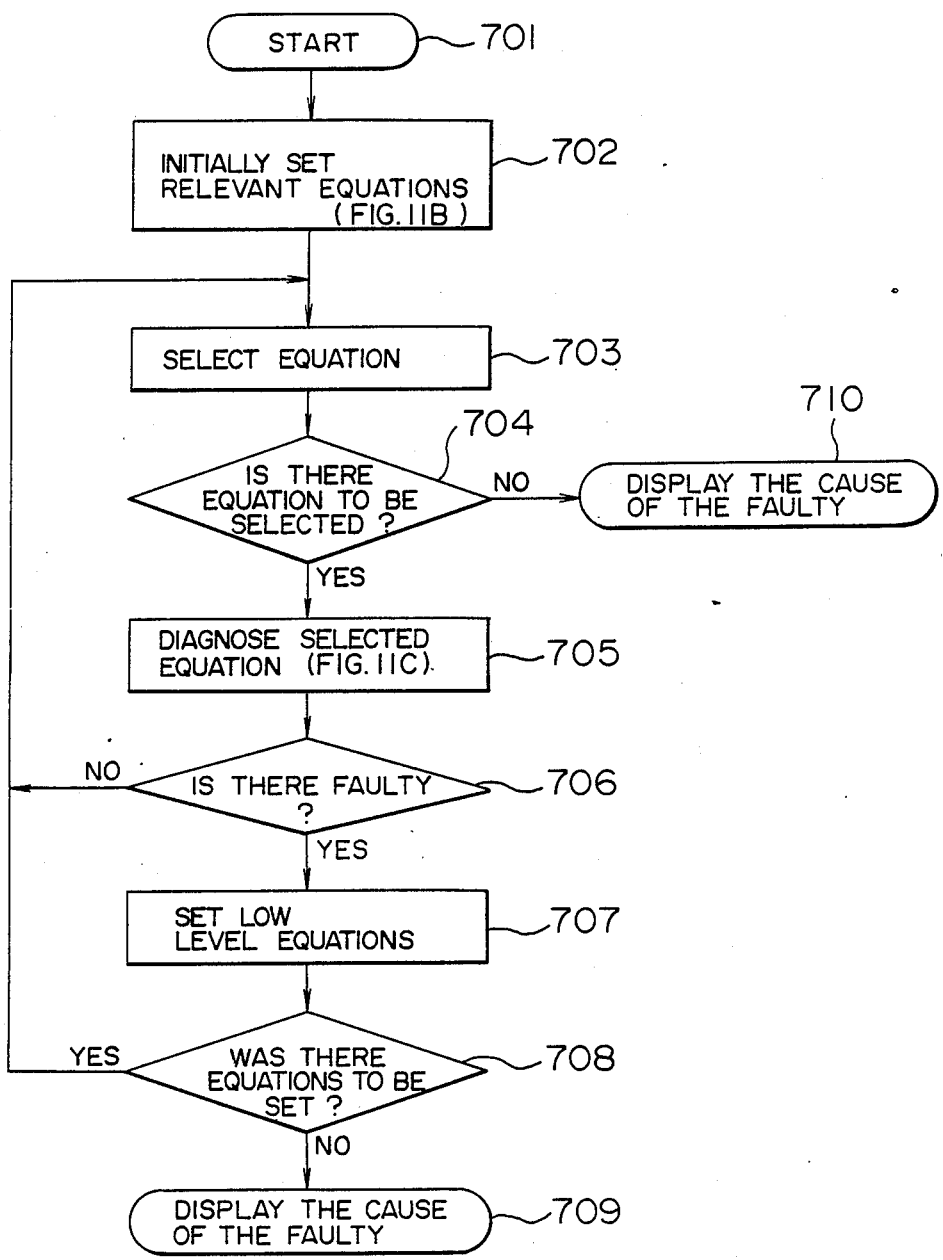

FIG. 11A shows an execution process of the diagnosis program 7. For example, in the above Schmitt trigger circuit, if a fault occurs such that an output voltage does not rise even if an input voltage is raised, the user instructs the execution of the diagnosis program to locate the fault.

The inference engine 4 starts the diagnosis program 7 in response to the user direction. The diagnosis program 7 initially sets the equations necessary for the diagnosis in a step 702. Specifically, in a step 7021, the name of circuit to be diagnosed, that is, "Schmitttrigger" is inputted by the user. In a step 7022, the deep knowledge base 1 is searched to select the equation whose object name matches to the "Schmitt-trigger" designated by the user, that is, the equations designated by 121 and 122 of FIG. 3.

In a step 7033, the preprocessing program 61 is started. The preprocessing program 61 is executed in the manner explained in FIGS. 9 and 10, and the data 310 shown in FIG. 4 is stored into the working database 3.

For the concluding equation relating to the representative behavior shown in FIG. 4, the following equations are initially set in the working area: "Change the base voltage of t1 to change the emitter current" (conf. 241), "Change the base voltage of t1 to change the collector current" (conf. 201), "Change the base voltage of t2 to change the emitter current" (conf. 241), "Change the base voltage of t2 to change the collector current" (conf. 201), "Take out a current from the end of the resistor r1 connected to the power supply to change the voltage" (conf. 211), "Take out a current from the end of the resistor r2 connected to the power supply to change the voltage" (conf. 211), "Take out a current from the end of the resistor r3 connected to the ground to change the voltage" (conf. 211), "Take out a current from the end of the resistor r4 connected to the ground to change the voltage" (conf. 211), and "Connect one end of the series-connected resistors to the ground and change the voltage at the other end (the collector voltage of t1) to change the voltage at the intermediate point (the base voltage of t2)" (conf. 221). Specifically, the storing of the data 310 shown in FIG. 7 into the working database 3 means the setting of the equation ((minus i.t1.collector)(minus v.t1.base))

which has a specific component name obtained by renaming the equation 201 shown in conf. 200 of FIG. 4 based on the information given by the data 313–316 of FIG. 7, that is, the equation having the second content described above, that is, "Change the base voltage of t1 to change the collector current".

In a step 703 of FIG. 11A, the equations are selected one by one, and in a step 705, the diagnosis by the selected equation is effected.

Specifically, the process shown in FIG. 11C is followed. In a step 7051, an equation used for the diagnosis, for example, ((minus i.t1.collector)(minus v.t1.base))

is displayed to the user. In a step 7052, the user checks if the actual input/output relationship in the Schmitt trigger circuit meets the above equation, and inputs the check result. Namely, when the equation is displayed, the user changes the base voltage of t1 and checks if the collector current changes. If it does, non-fault is inputted, and if it does not, fault is inputted.

It is now assumed that the actual input/output relationship does not meet the selected equation (221 in FIG. 4) of "Connect the one end of the series-connected resistors to the ground and change the voltage at the other end (the collector voltage of t1) to change the voltage at the intermediate point (the base voltage of t2)". After the equation has been displayed in the step 7051, the user inputs the fault in the step 7052.

When the fault for the equation is informed by the user (step 706), the diagnosis program 7 selects low-level equations (step 707). The low-level equations correspond to the if portions of the knowledge 221, and they are equations derived from the conf-list of the shallow knowledge base 2, for example, the equations stored in 2200 of FIG. 4, by modifying in accordance with the content of the working database 3 shown in FIG. 7. Those are identical to the equations representing the Ohm's law and the Kirchhoff's law relating to the resistors r4 and r5, stored in the deep knowledge base 1.

The diagnosis program 7 effects the diagnosis by those low-level equations, identifies the component, for example, r4 corresponding to the equation or equations which do not match to the actual input/output relationship, as a fault circuit (steps 708 and 709), and displays it by the display 5.

FIG. 12 shows an execution process of the design program 8. When the inference engine 4 starts the design program 8 in response to the user direction, the design program 8 first inquires to the user the input/output specification of the equipment to be designed, in accordance with the process shown in FIG. 12. It is now assumed that the design specification specifies that "When a voltage change of $V_1$ volts is inputted, a voltage change of $V_1 \times 0.5$ volts is to be outputted" (step 802). When the specification is inputted, the design program 8 searches the deep knowledge base 1 to find a circuit or component (equation) which converts one voltage change to other voltage change (step 803). If such a circuit or component has been stored in the deep knowledge base 1, that circuit or component is displayed (step 809), and if it has not been stored, the shallow knowledge base 2 is searched (step 805). The equation h3r (221 in FIG. 4)

(conf. (h3r v.obj-0. term-1 (minus v.obj-2. term-3)))

stored in the shallow knowledge base 2 represents the conversion of one voltage change to the other voltage change, and it matches to the specification. The design program 8 then searches the "conf-list" (2200 in FIG. 4) of h3r and determines that the Ohm's law shown by 2201 in FIG. 4

((minus v.obj-0. term-2) vo.obj-0. term-1

(minus i.obj-0. term-1))

and the Kirchhoff's law shown by 2202 in FIG. 4

(i.obj-0. term-2 i.obj-0. term-1)

are sub-specifications or sub-goal of the whole design to the obj-0, and the Ohm's law shown by 2203 in FIG. 4

((minus v.obj-1. term-2) v.obj-1. term-1

(minus i.obj-1. term-1))

and the Kirchhoff's law shown by 2204 of FIG. 4

(i.obj-1. term-2 i.obj-1. term-1)

are specifications to the obj-1, and the fact that "the voltage at the terminal term-2 of the obj-1 does not change, that is, the terminal term-2 is connected to either ground or power supply" is a new specification of the equipment, based on the Kirchhoff's law (i.obj-1 term-1 i.obj-0. term-2 i.obj-2. term-3)

(step 807). The specification to the obj-0 and obj-1 are further designed in detail in accordance with the process of FIG. 12. Since it is determined that they may be resistors based on the information (110 in FIG. 3) of resistors stored in the deep knowledge base 1, it is determined that the specification initially designated by the user can be attained by serially connecting two resistors and connecting one end thereof to the ground or power supply.

If the circuit configuration is determined by the detailed design, it is displayed (steps 808 and 809), and if the circuit configuration or component which meets the required specification is not found, it is so displayed (step 810).

As seen from the above embodiments, according to the present invention, when the user inputs the exemplar behavior of the equipment as one experiential rule, the expert system automatically generates shallow knowledge corresponding to the experiential rule which is met if one of equations or a certain term in the equation is neglected, based on the equation relating to the configuration and behavior of the equipment stored in the deep knowledge base.

The shallow knowledge thus generated is applicable to envision the behavior of other equipment having a similar configuration. However, in order to avoid misapplication of the shallow knowledge due to two broad interpretation thereof, the following measure is effective in the generation process of the shallow knowledge.

Figures 13, 14:
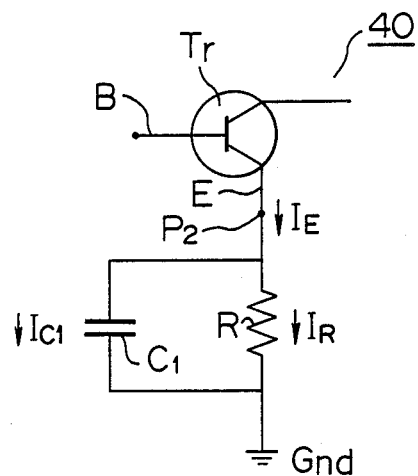
FIG. 13 shows a circuit diagram of an electrical circuit 40 which is another example of the equipment which is the object of inference.
FIG. 14 shows an example of shallow knowledge 400 prepared for a behavior of the electrical circuit 40.

For example, in an electrical circuit shown in FIG. 13 which comprises a transistor Tr, a resistor R and a capacitor C1, it is assumed that the user teaches, as an experiential rule, that "$I_E=I_R$ may be valid". If the shallow knowledge is generated based on only the Kirchhoff's law $IE=I_{Cl}+I_R$ which is satisfied at a junction P2 of the emitter E of the transistor Tr and R, C1, the shallow knowledge as shown in FIG. 14 is generated. In FIG. 14, the contents of the conf-list portion 401, conf portion 402 and neglection portion 403 are shown by the symbols $I_E$, $I_{Cl}$ and $I_R$ in order to facilitate the understanding.

$I_E$, $I_{Cl}$ and $I_R$ are converted to the generalized expressions such as "i.obj-0. term-1" and the shallow knowledge 400 is stored into the shallow knowledge base 2. Since the content of the "conf-list" which is the condition part in the shallow knowledge 400 is based on only the Kirchhoff's law which is satisfied at the point P2, it is also applicable to electrical circuits 41 and 42 similar to the circuit of FIG. 13, which include parallel circuits of R and L or $R_1$ and $R_2$ as shown in FIGS. 15A and 15B, respectively. Thus, there may be a possibility that misinference $I_E=I_R$ or $I_E=I_{R1}$ is done independently of the value of the inductance L or the resistor $R_2$ in those circuits.

The above problem may be solved by including the equations (1), (2), (3) and (5) which specify the configuration and use condition of the electrical circuit 40, in addition to the equation (4), in the "conf-list" 401' as shown in FIG. 16 when the shallow knowledge having the conclusion portion $I_E=I_R$ is generated in the electrical circuit 40 of FIG. 13. In the shallow knowledge 400', since the application of the knowledge is limited to the electrical circuit including the parallel circuit of R and C by the "conf-list", it is not applied to the electrical circuit 41 or 42 and the misinterference is avoided.

The shallow knowledge 400' may be generated by providing the following extended explanation step 904' between the steps 904 and 905 of the shallow knowledge production program 9 shown in FIG. 6.

For example, it is assumed that, in the electrical circuit 40 of FIG. 13, the equations (1)-(7) shown in FIG. 17 have been stored in the deep knowledge base 1 and the knowledges A and B shown in FIG. 18 have been stored in the shallow knowledge base 2, and the user inputs that "the current $I_E$ flowing at the emitter terminal E of the transistor Tr has increased and the current $I_R$ flowing through the resistor R has increased" in the step 902 of FIG. 6. In the step 903, the equation (4) is selected as a relevant equation, and in the step 904, $I_{Cl}$ in the equation is selected as a term to be neglected.

In the extended explanation step 904' executed following to the step 904, the item which lastly appears in the exemplar behavior given by the user ($I_R$ in the present example) is considered and the envisioning program 6 sequentially envisions impacts to other items if the item $I_R$ is increased. In this behavior envisioning process, the calculation of $V_R$ by the equation (3), the calculation of $V_{Cl}$ by the equation (1) and the calculation of $I_{Cl}$ by the equations (2) and (5) are conducted. $I_{Cl}$ is the term neglected in the generation of the shallow knowledge. When the calculation in the behavior envision reaches the neglected item $I_{Cl}$, the behavior envision is stopped. In this case, the equations (3), (1), (2) and (5) appeared in the process of behavior envision are displayed on the display screen, and the user is asked if there are items to be neglected in the equations. In the present example, the user designates the equation (2) to be neglected. Thus, in the composing step 905 of the equation, the shallow knowledge 400' having the content shown in FIG. 16 is produced.

The present invention offers the following advantages.

(1) The deep knowledge, that is, the knowledge relating to the behavior of the equipment, and the shallow knowledge, that is, the knowledge relating to the representative behavior of the equipment are consistently expressed by the equations.

(2) Since the contents of the deep knowledge are strictly related to the physical laws and rules, the workload to construct the knowledge base is reduced by the application of the circuit theory.

(3) The application range is not limited to the prepared huristics but the shallow knowledge (contents of the shallow knowledge base 2) can be prepared based on the deep knowledge (contents of the deep knowledge base 1) and the exemplar behavior.

(4) The behavior envision, fault diagnosis and design of the equipment which are hard to accomplish in an efficient manner with only the deep knowledge because the conclusion is not reached due to insufficient local information or the volume of information is too large to process in a practical processing time, can be effected by using both the deep knowledge and the shallow knowledge.

(5) The behavior envision, fault diagnosis and design of the equipment which are difficult to attain without error with only the shallow knowledge can be effected by using both the deep knowledge and the shallow knowledge. The fault diagnosis of the complex equipment for which it is hard to collect error-free shallow knowledge can be effected without error by using the related deep knowledge.

(6) The equations relating to the representative behavior of the equipment, which are the shallow knowledge, hierarchically represent the behavior of the high level equipment. The hierarchical mechanism permits handling of a complex object.

(7) By storing the equations describing the behavior of the circuit and the exemplar behavior in the system, the behavior envision, fault diagnosis and design can be effected by one system.

(8) The information as to which shallow knowledge in the shallow knowledge base 2 is utilized is stored in the working database 3 (312 in FIG. 7). By this information, the process of handling only a portion of a large scale equipment in detail and other portion roughly can be conducted by utilizing all knowledges corresponding to the portion to be handled in detail (by turning on the value of the state) and utilizing only the shallowest knowledge for the portion to be handled roughly (by turning off the value of the state).

In order to handle only the portion of the large scale equipment in detail and other portion roughly without the above mechanism, it is necessary to prepare the database by the combinations of all possible cases or to restructure the database in the execution stage. As a result, the capacity of the database or the processing time is impractically large.

(9) The shallow knowledge is generated by neglecting a portion of the deep knowledge. Accordingly, it may not be well applied depending on the situation and contradition may be brought up. Countermeasure thereto is required for the envisioning means 6, diagnosis means 7 and design means 8.

In the present embodiment, the envisioning means 6 is provided with the selection means (604 in FIG. 9) so that it is applicable to such a case by utilizing the dependency directed backtracking method. Since the diagnosis means 7 is prepared by using the envisioning means 6, it is also applicable to such a case. The design means 8 can retrieve the shallow knowledge and the deep knowledge which are applicable to such a case and hence it is applicable to such a case.

In the embodiment, in order to simplify the explanation, a formula derived by differentiating the equation and substituting all constants by "1" is used instead of the equation per se, although a formula which represents the behavior of the equipment such as the equation may be directly processed.

In the embodiment, the equations are used as the information relating to the behavior of the equipment, stored in the deep knowledge base 1 and the shallow knowledge base 2, although logical expressions may be used when the behavior of the equipment can be represented by the logical expressions, like in a digital circuit. The equations, logical expressions or any other forms may be used so long as the behavior of the equipment is represented.

In the embodiment, the envisioning means 6 envisions the behavior for only the item selected by the selection step, although the overall behavior may be envisioned separately. Instead of user's input for selection, a large impact item may be inferred by numerical calculation.

In the embodiment, the shallow knowledge production means 9 uses the user input as the exemplar behavior, although other exemplar behavior such as actual measurement or numerical simulation may be used.

In the embodiment, the deep knowledge base 1, the shallow knowledge base 2 and the working database 3 are separate databases, although they may be in one database or in a plurality of databases so long as the same contents are stored.

I claim:

1. An expert system for inferring by using deep knowledge and shallow knowledge, comprising:

first knowledge base means for storing a plurality of deep knowledges relating to an equipment to be inferred;

second knowledge base means for storing a plurality of shallow knowledges relating to representative behavior of the equipment to be inferred;

working memory means for temporarily storing information necessary for inference;

input means operated by a user to input information;

display means for outputting an inferred result; and inference means responsive to the input information from said input means for inferring by said first and second knowledge base means and said working memory means and outputting the result to said display means;

each of the shallow knowledges having a knowledge structure derived by neglecting a portion of the content of at least one deep knowledge or shallow knowledge necessary to explain the representative behavior of the equipment to be inferred.

2. An expert system according to claim 1 wherein each of the deep knowledges stored in said first knowledge base means includes an object name for designating an object to which the knowledge relates, information representing at least one equation relating to the behavior of the object, and information for defining a connection relation of components when the object comprises a plurality of components.

3. An expert system according to claim 2 wherein each of the shallow knowledge stored in said second knowledge base means includes information representing the components of the object to which the information relates, information representing at least one concluding equation relating to the representative behavior of the object, information representing at least one condition equation indicating an environment in which said concluding equation is satisfied, and information representing an item neglected in deriving said concluding equation from said condition equation.

4. An expert system according to claim 1 wherein said inference means includes program means for selecting, from the knowledges stored in said first and second knowledge base means, knowledge which matches to the exemplar behavior of the object to be inferred inputted by the user through said input means, if a portion of the knowledge is neglected, and adding the shallow knowledge newly generated based on the selected knowledge to said second knowledge base means.

5. An expert system according to claim 1 wherein said inference means includes means responsive to the information representing the behavior of the object to be inferred inputted by the user through said input means for envisioning the operation of the object based on the knowledges stored in said first and second knowledge base means.

6. An expert system according to claim 1 wherein said inference means includes means for detecting knowledge relating to the behavior which matches to a specification of the equipment inputted by the user through said input means based on the knowledges stored in said first and second knowledge base means and outputting to said display means a structure of the object which is a base of the behavior, as design information which meets the specification.

* * * * *